(12) United States Patent
Okumura

(10) Patent No.: US 7,113,238 B2
(45) Date of Patent: Sep. 26, 2006

(54) TRANSFLECTIVE LCD HAVING A REFLECTIVE FILM OVERLAPPING THE TRANSMISSIVE AREA AND ALIGNMENT REGULATORS IN PLAN VIEW

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 60 days.

(21) Appl. No.: 10/778,118

(22) Filed: Feb. 17, 2004

(65) Prior Publication Data

US 2005/0024559 A1 Feb. 3, 2005

(30) Foreign Application Priority Data

Mar. 13, 2003 (JP) ............... 2003-068339

(51) Int. Cl.
*G02F 1/1335* (2006.01)
(52) U.S. Cl. .............. 349/114; 349/113; 349/129
(58) Field of Classification Search ........... 349/114, 349/113, 129
See application file for complete search history.

(56) References Cited

U.S. PATENT DOCUMENTS

| 6,424,397 | B1 | 7/2002 | Kuo | |
| 6,590,627 | B1 * | 7/2003 | Tomioka et al. ............ | 349/139 |
| 6,788,375 | B1 * | 9/2004 | Ogishima et al. ........... | 349/130 |
| 2004/0189906 | A1 * | 9/2004 | Kim ........................... | 349/114 |

FOREIGN PATENT DOCUMENTS

| JP | A 10-333180 | 12/1998 |
| JP | A 11-242225 | 9/1999 |
| JP | A 11-242226 | 9/1999 |
| JP | A 2001-215515 | 8/2001 |
| JP | A 2002-350853 | 12/2002 |

OTHER PUBLICATIONS

Jisaki et al., "Development of transflective LCD for high contrast and wide viewing angle by using homeotropic alignment," Asia Display, IDW, 2001.

* cited by examiner

*Primary Examiner*—Andrew Schechter
*Assistant Examiner*—(Nancy) Thanh-Nhan P Nguyen
(74) *Attorney, Agent, or Firm*—Oliff & Berridge, PLC

(57) ABSTRACT

The invention provides a liquid crystal display device in which generation of display defects, such as afterimages or spot-shaped stains, can be reduced or suppressed, and in addition a bright display having a wide viewing angle can be obtained, in a transflective liquid crystal display device. A liquid crystal display device according to the present invention includes a liquid crystal layer interposed between a pair of substrates, and a transmissive display area and a reflective display area provided in one dot area. The liquid crystal layer includes a liquid crystal having a negative dielectric anisotropy representing that an initial alignment state is a vertical alignment, and pixel electrodes to drive the liquid crystal and a common electrode are formed in the liquid crystal layer sides of the pair of substrates, respectively. In the pixel electrodes, as an alignment regulating device to regulate alignment of the liquid crystal, slits formed by opening some parts of the electrodes are formed in the transmissive display areas, and the slits are arranged to two-dimensionally overlap with a reflective film.

8 Claims, 8 Drawing Sheets

F I G. 1
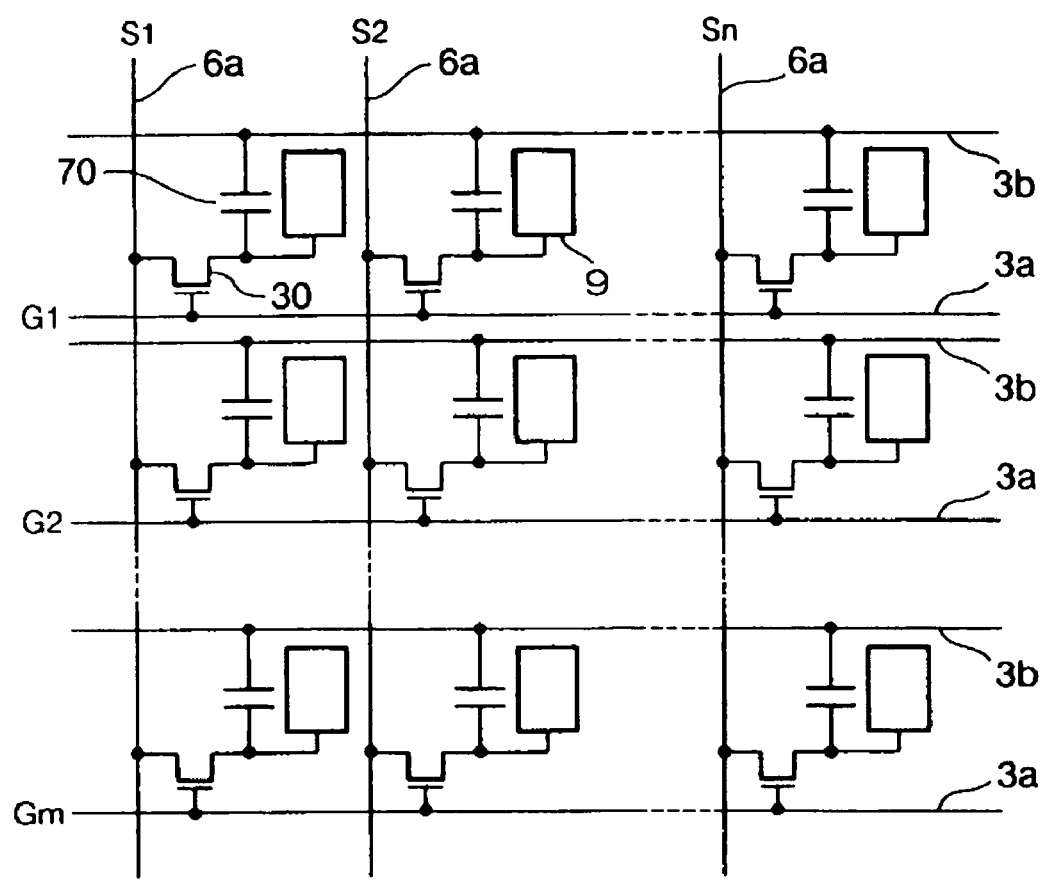

TRANSFLECTIVE LCD HAVING A REFLECTIVE FILM OVERLAPPING THE TRANSMISSIVE AREA AND ALIGNMENT REGULATORS IN PLAN VIEW

BACKGROUND OF THE INVENTION

1. Field of Invention

The present invention relates to a liquid crystal display device and an electronic apparatus. More specifically, the invention relates to obtaining a display having a high contrast and a wide viewing angle in a transflective liquid crystal display device in which display is performed in both a reflection mode and a transmission mode.

2. Description of Related Art

A related art liquid crystal display device includes a transflective liquid crystal display device providing display that is visible using external light, similarly to the reflective liquid crystal display device, in a bright place. The transflective liquid crystal display provides display uses a backlight, similarly to the transmissive liquid crystal display device, in a dark place. Such a related art transflective liquid crystal display device includes a liquid crystal display device in which a liquid crystal layer is interposed between an upper substrate and a lower substrate, a reflective film obtained by forming window portions to transmit light in a metal film made of aluminum, etc., is provided on the inner surface of a lower substrate, and the reflective film is then allowed to serve as a transflective plate. In this case, in the reflection mode, the external light incident from the upper substrate side passes through the liquid crystal layer, is reflected from the reflective film at the inner surface of the lower substrate, passes through the liquid crystal layer again, and is emitted from the upper substrate side, thereby contributing to the display. On the other hand, in the transmission mode, light from a backlight incident from the lower substrate side passes through the liquid crystal layer from the window portions of the reflective film and is externally emitted from the upper substrate side, thereby contributing to the display. Therefore, in an area in which the reflective film is formed, the areas in which the window portions are formed become the transmissive display areas, and the areas other than transmissive display areas become the reflective display areas.

However, the related art transflective liquid crystal display device is subject to a problem in that the viewing angle in the transmissive display is narrow. This is because a transflective plate is provided at an inner surface of a liquid crystal cell so as not to generate parallax, and thus there is a restriction in that the reflective display is performed using only one polarizer provided in an observer side. Therefore, the degree of freedom in the optical design is small. Therefore, in order to address or solve the above, a related art liquid crystal display device uses a vertically aligned liquid crystal, which is disclosed in "Development of transflective LCD for high contrast and wide viewing angle by using homeotropic alignment", M. Jisaki et al., Asia Display/IDW'01, pp. 133–136 (2001), (hereinafter "Jisaki et al."). Three features thereof are as follows:

(1) A "VA (Vertical Alignment) mode" is employed, in which a liquid crystal having a negative dielectric anisotropy is aligned vertically at the substrate and then it is slanted by applying a voltage.

(2) A "multi gap structure" is employed, in which the thickness of the liquid crystal layer in the transmissive display areas and the reflective display areas are different each other (for this feature, see, for example, Japanese Unexamined Patent Application Publication No. 11-242226).

(3) The transmissive display areas are formed as regular octagons, and projections are provided at the centers of the transmissive display areas on the counter substrate such that the liquid crystal molecules are slanted in eight directions in those areas. That is, a so-called "alignment division structure" is employed.

SUMMARY OF THE INVENTION

The multi-gap structure as disclosed in Japanese Unexamined Patent Application Publication No. 11-242226 is useful to adjust the electro-optical characteristics (transmissivity-voltage characteristic and reflectivity-voltage characteristic) in the transmissive display areas and the reflective display areas. This is because the light passes through the liquid crystal layer only one time in the transmissive display areas, while the light passes through the liquid crystal layer two times in the reflective display areas.

On the other hand, the alignment division method employed by Jisaki et al. is an elegant technique using the projections and the step difference of the multi gap. However, this method is subject to one problem. That is, as shown in a photomicrograph in a bright transmissive display described in the above Jisaki et al., black spots due to the projections for alignment control are generated at the centers of the transmissive display areas. This is because a sufficient voltage is not applied to the liquid crystal in the projection forming areas due to capacitance of the projections, and it is difficult to operate the liquid crystal due to discontinuous points in the liquid crystal alignment referred to as disclination, so that a good bright display cannot be obtained. On the other hand, if such projections are not provided, the liquid crystal molecules are slanted in disordered directions when a voltage is applied, and disclinations are generated in the boundaries of other liquid crystal alignment areas, thereby causing afterimages, etc. Further, since the respective alignment areas of the liquid crystal have different visual characteristics, a problem occurs in that unevenness of displaying is visualized when viewing a display plane from an oblique direction.

The present invention addresses or solves the above, and provides, in a transflective liquid crystal display device, a liquid crystal display device capable of reducing or suppressing the generation of display defects, such as afterimages or spot-shaped stains, in both transmissive display and reflective display, allowing a wide viewing angle to be obtained, and reducing or preventing defects, such as a decrease in brightness and the like due to formation of projections for liquid crystal alignment control as described above from being generated.

In order to address or accomplish the above, a liquid crystal display device of the present invention includes a liquid crystal layer interposed between a pair of substrates, and transmissive display areas for transmissive display and reflective display areas for reflective display are provided in one dot area. The liquid crystal layer is formed of liquid crystal having a negative dielectric anisotropy whose initial alignment state is vertical, electrodes to drive the liquid crystal are formed on the pair of substrates on the liquid crystal layer side, respectively, and the electrodes of at least one of the substrates are provided with slit-shaped opening portions formed by making opening portions in parts of the electrodes, and/or convex-shaped portions made of a dielectric substance formed on the electrodes, as an alignment regulating device to regulate the alignment of the liquid crystal. Of the opening portions and/or the convex-shaped portions, the opening portions for transmissive-area liquid crystal control and/or the convex-shaped portions for transmissive-area liquid crystal control to regulate the alignment of the liquid crystal in the transmissive display areas are arranged to two-dimensionally overlap with at least a reflective film. In this case, "be arranged to two-dimensionally overlap" means that the respective members are arranged to overlap as viewed, for example, from a normal direction of the substrate.

According to this liquid crystal display device, since the directions in which the liquid crystal molecules are slanted are regulated by the opening portions and/or the convex-shaped portions as an alignment regulating device, disclinations hardly occur when a voltage is applied between the electrodes, so that the generation of display defects, such as afterimages, etc., can be reduced or suppressed, and hardly any defects where unevenness of displaying is visualized when viewing from an oblique direction occur.

In spite of preparation of such an alignment regulating device, in the present invention, a relative bright display can be obtained from the areas where the alignment regulating device are formed. That is, in the present invention, since, of the opening portions and/or the convex-shaped portions as the alignment regulating device, the opening portions for transmissive-area liquid crystal control and/or the convex-shaped portions for transmissive-area liquid crystal control to regulate alignment of the liquid crystal in the transmissive display areas are arranged to two-dimensionally overlap with at least a reflective film, the areas where the opening portions for transmissive-area liquid crystal control and/or the convex-shaped portions for transmissive-area liquid crystal control are formed can be used for the reflective display, and since the light incident from a display plane side passes through the liquid crystal layer two times, it is possible to obtain a bright display only by slightly slanting the liquid crystal molecules. That is, since the light incident from a back surface side passes through the liquid crystal layer only one time in the transmissive display, while the light incident from the display plane side passes through the liquid crystal layer two times in the reflective display, a relatively bright display can be realized in a case in which the same voltage is applied (a case in which the liquid crystal molecules are slanted to the same extent).

As described above, in the related art, the areas where the opening portions for transmissive-area liquid crystal control and/or the convex-shaped portions for transmissive-area liquid crystal control are formed have been used only as the transmissive display areas, and the decrease of transmissivity in the areas has been neglected. However, in the present invention, by intentionally using the areas where the opening portions for transmissive-area liquid crystal control and/or the convex-shaped portions for transmissive-area liquid crystal control are formed as the reflective display areas, it is possible to contribute to enhancement of brightness of the bright display in the areas.

As described above, in the liquid crystal display device of the present invention, since the alignment regulating device are provided in the transflective liquid crystal display device, the generation of display defects, such as afterimages or spot-shaped stains in both the transmissive display and the reflective display, is reduced or suppressed, a wide viewing angle can be obtained, and in addition, defects that the brightness is decreased due to formation of the alignment regulating device hardly occur. Furthermore, in a case where the slit-shaped opening portions as the alignment regulating device are formed in the electrodes, since a voltage is not applied in the areas where the opening portions are formed, alignment failure of the liquid crystal occurs. On the other hand, in a case where the convex-shaped portions as the alignment regulating device are formed on the electrodes, since a sufficient voltage is not applied due to capacitance of the convex-shaped portions, alignment failure of the liquid crystal occurs.

In the liquid crystal display device of the present invention, the pair of substrates may comprise an upper substrate and a lower substrate, a side of the lower substrate opposite to the liquid crystal layer side thereof may be provided with a backlight for transmissive display, and a reflective film for reflective display selectively formed in the reflective display areas may be interposed between the lower substrate and the liquid crystal layer. In addition, a reflective film for reduction or prevention of transmission arranged to two-dimensionally overlap with the opening portions for transmissive-area liquid crystal control and/or the convex-shaped portions for transmissive-area liquid crystal control formed in the transmissive display areas may be formed in the transmissive display areas. Like above, by interposing the reflective film for reduction or prevention of transmission other than the reflective film for the reflective display between the lower substrate and the liquid crystal layer to overlap with the opening portions for transmissive-area liquid crystal control and/or the convex-shaped portions for transmissive-area liquid crystal control as the alignment regulating device in the transmissive display areas, since the light from the backlight is not used for a display in the areas where the opening portions for transmissive-area liquid crystal control and/or the convex-shaped portions for transmissive-area liquid crystal control are formed, natural light incident from the upper substrate side passes through the liquid crystal layer two times to be used for the reflective display, so that it is possible to reduce or suppress a decrease in brightness due to the formation of the alignment regulating device.

Of the opening portions for transmissive-area liquid crystal control and/or the convex-shaped portions for transmissive-area liquid crystal control, at least the opening portions and/or the convex-shaped portions provided in the electrodes of the lower substrate side may be arranged to two-dimensionally overlap with the reflective film. In this case, the opening portions and/or the convex-shaped portions as the alignment regulating device, and the reflective film arranged to overlap with them are provided in the same substrate (lower substrate) side, so that mutual alignment therebetween are facilitated, and it is possible to form the reflective film having a size almost equal to the opening portions and/or the convex-shaped portions. Therefore, it is possible to ensure in maximum a size (area seen two-dimensionally) of the transmissive display areas, so that the liquid crystal display device can be used suitably as a display unit of an electronic apparatus in which the transmissive display is valued.

Furthermore, in the present invention, if at least one of the opening portions for transmissive-area liquid crystal control and/or the convex-shaped portions for transmissive-area liquid crystal control, out of the opening portions and/or the convex-shaped portions as the alignment regulating device, is arranged to overlap with the reflective film, the enhancement of brightness as described above can be obtained. However, by arranging all of the opening portions and/or the convex-shaped portions provided in the electrodes to two-dimensionally overlap with the reflective film, it is possible to further preferably realize the enhancement of brightness.

The liquid crystal layer may be thicker in the transmissive display areas than in the reflective display areas, and the liquid crystal display layer may be thicker in the areas where the reflective film arranged to two-dimensionally overlap with the opening portions for transmissive-area liquid crystal control and/or the convex-shaped portions for transmissive-area liquid crystal control is formed than in the reflective display areas. As described above, by making the liquid crystal layer in the areas where the reflective film arranged to two-dimensionally overlap with the opening portions for transmissive-area liquid crystal control and/or the convex-shaped portions for transmissive-area liquid crystal control is formed be thicker than that in the reflective display areas, it is possible to further enhance the brightness in the areas where the opening portions for transmissive-area liquid crystal control and/or the convex-shaped portions for transmissive-area liquid crystal control are formed.

In order to make the liquid crystal layer in the transmissive display areas thicker than the liquid crystal layer in the reflective display areas, a liquid crystal layer-thickness adjusting layer may be provided between at least one substrate of the pair of substrates and the liquid crystal layer. In this case, since the thickness of the liquid crystal layer in the reflective display areas can be allowed to be less than the thickness of the liquid crystal layer in the transmissive display areas due to existence of the liquid crystal layer-thickness adjusting layer, retardation in the reflective display areas and retardation in the transmissive display areas can be sufficiently close to each other or can be almost equal each other, thereby accomplishing enhancement of contrast.

In the present invention, the alignment regulating device may have a construction to regulate slanting directions of vertically aligned liquid crystal molecules in accordance with variation in electric field. In this case, it is possible to allow the vertically aligned liquid crystal molecules to be regularly slanted in a predetermined direction. As a result, it is difficult that alignment disorder (disclination) of the liquid crystal molecules occurs, so that it is possible to reduce or avoid a display defect, such as light leakage, and to provide a liquid crystal display device having a high display property. Furthermore, when the convex-shaped portions are specifically formed as the construction to regulate the slanting direction of the liquid crystal molecules, the surfaces of the convex-shaped portions may be constructed to be oblique by a predetermined angle from the vertical alignment direction of the liquid crystal molecules.

An electronic apparatus according to the present invention includes the aforementioned liquid crystal display device. According to this electronic apparatus, display defects, such as afterimages or spot-shaped stains, can be reduced or suppressed, and it is possible to provide an electronic apparatus including a display unit excellent in display characteristic, which is bright and of which a viewing angle is wide.

BRIEF DESCRIPTION OF THE DRAWINGS

FIG. 1 is a schematic circuit diagram of a liquid crystal display device according to a first exemplary embodiment of the present invention;

DETAILED DESCRIPTION OF PREFERRED EMBODIMENTS

[First Exemplary Embodiment]

A first exemplary embodiment of the present invention is described below with reference to the figures.

A liquid crystal display device of this exemplary embodiment is an example of an active matrix type liquid crystal display device employing a thin film transistor (hereinafter "TFT") as a switching element.

Figure 2:
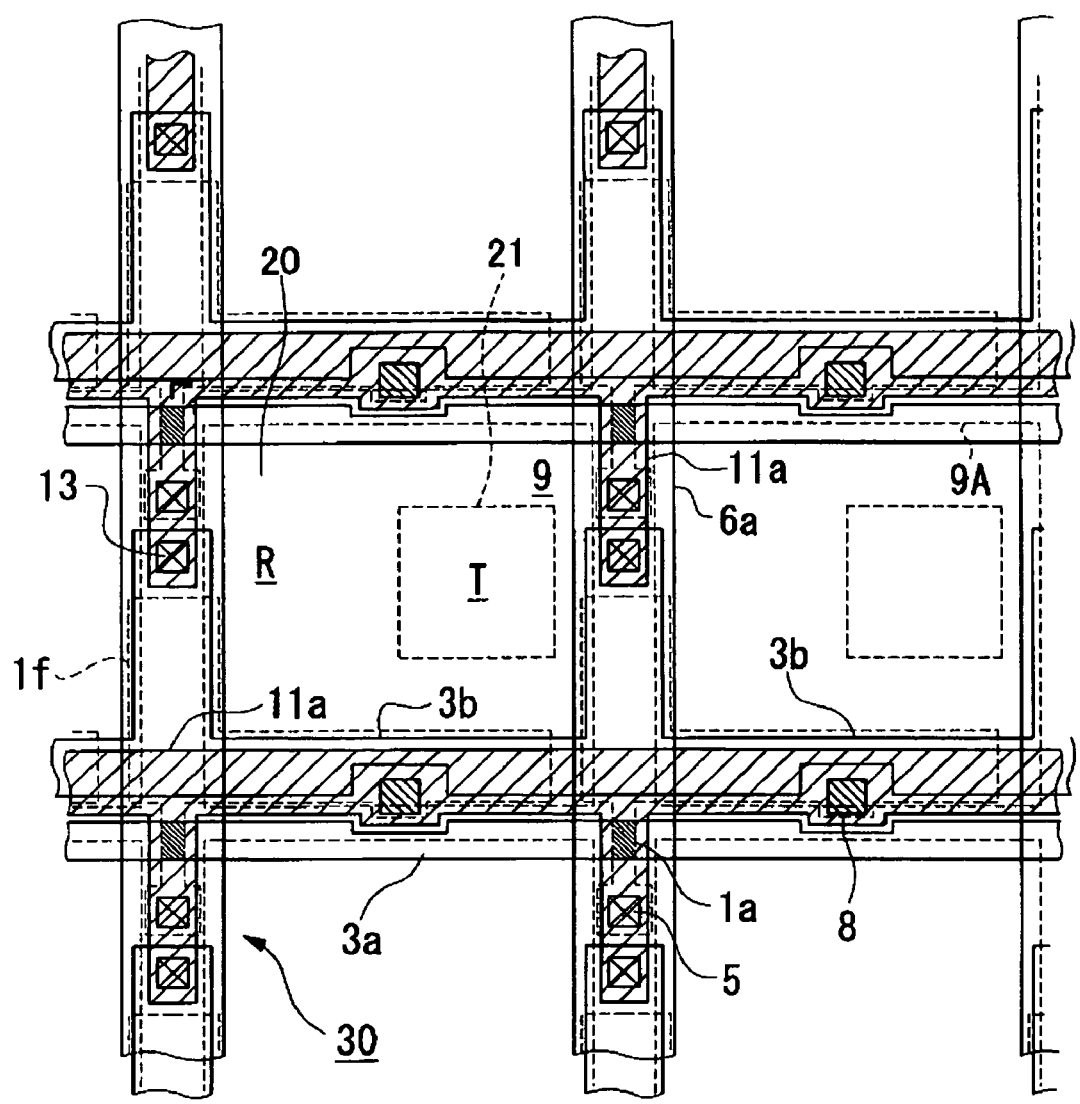
FIG. 2 is a plan view illustrating a structure of dots in the liquid crystal display device.
Figure 3A:
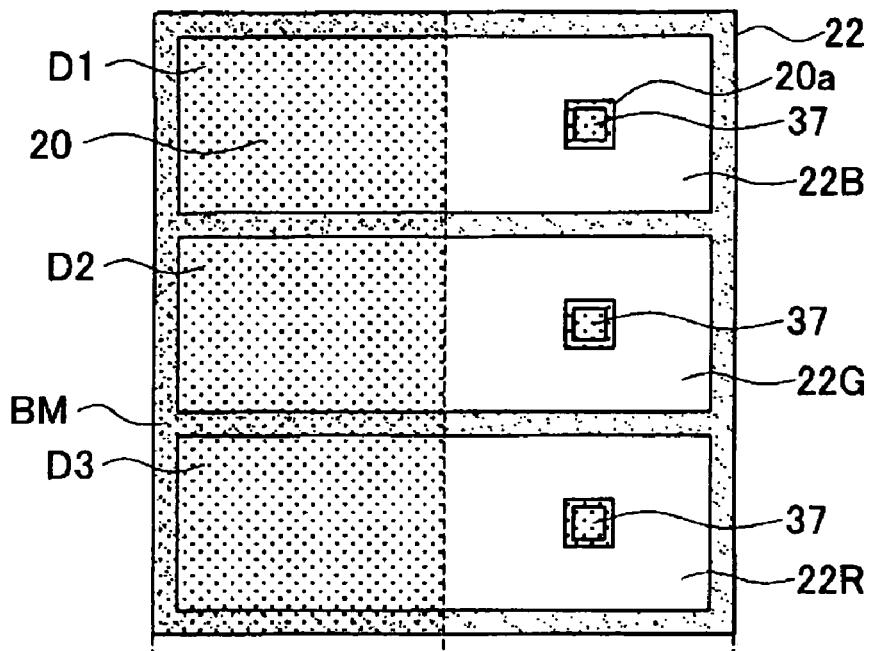
FIGS. 3A and 3B are a schematic plan view and a schematic cross-sectional view illustrating a significant part of the liquid crystal display device.
Figure 3B:
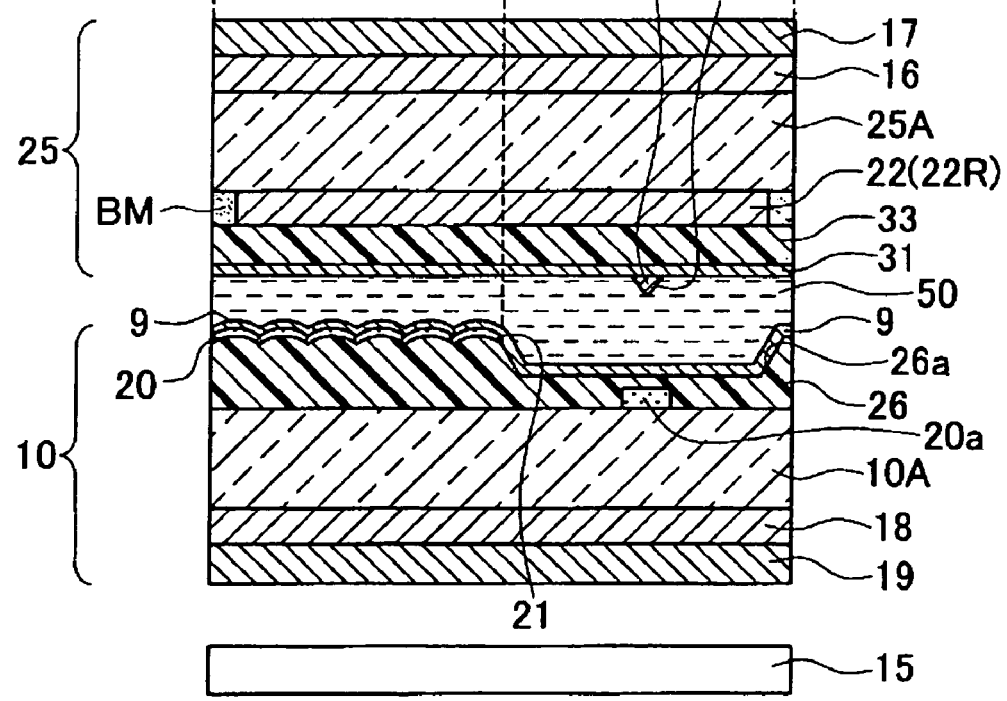

FIG. 1 is a schematic circuit diagram of a plurality of dots arranged in a matrix shape and constituting an image display area of the liquid crystal display device according to this exemplary embodiment, FIG. 2 is a plan view illustrating the structure of the plurality of dots adjacent to each other on a TFT array substrate, and FIGS. 3A and 3B are a schematic plan view (upper part) and a schematic cross-sectional view (lower part) illustrating the structure of the liquid crystal display device. In the figures, in order to make the respective layers or the respective members recognizable, the respective layers and members have different scales.

In the liquid crystal display device of this exemplary embodiment, as shown in FIG. 1, pixel electrodes 9 and TFTs 30 functioning as switching elements to control the pixel electrodes 9 are formed in a plurality of dots arranged in a matrix shape and constituting an image display area, respectively, and data lines 6a to supply image signals are electrically connected to sources of the TFTs 30. The image signals S1, S2, . . . , Sn to be written to the data lines 6a are line-sequentially supplied in that order, or are supplied to the plural data lines 6a adjacent to each other in a unit of group. Further, scanning lines 3a are electrically connected to gates of the TFTs 30, and scanning signals G1, G2, . . . , Gm are line-sequentially supplied in pulses to a plurality of scanning lines 3a at a predetermined timing. The pixel electrodes 9 are electrically connected to drains of the TFTs 30, and by turning on the TFTs 30 functioning as the switching elements for a certain period of time, the image signals S1, S2, . . . , Sn supplied from the data lines 6a are written at a predetermined timing.

Predetermined levels of the image signals S1, S2, . . . , Sn written to the liquid crystal through the pixel electrodes 9 are held between the pixel electrodes and a common electrode to be described later for a predetermined time. The liquid crystal, in which the alignments or orders of molecule sets varies in accordance with the voltage level applied thereto, modulates light to make gray scale display possible. In order to reduce or prevent the held image signals from being leaked, storage capacitors 70 are added in parallel with the liquid crystal capacitor formed between the pixel electrodes 9 and the common electrode. Reference numeral 3b denotes capacitor lines.

Referring to FIG. 2, the two-dimensional structure of the TFT array substrate constituting the liquid crystal display device according to this exemplary embodiment is described below.

As shown in FIG. 2, on the TFT array substrate, a plurality of rectangular pixel electrodes 9 (of which profiles are expressed by dotted lines 9A) are provided in a matrix shape, and the data lines 6a, the scanning lines 3a, and the capacitor lines 3b are provided along longitudinal and transverse boundaries of the pixel electrodes 9. In this exemplary embodiment, the inside of an area in which the data lines 6a, the scanning lines 3a, and the capacitor lines 3b, which are arranged to surround a pixel electrode 9, and a pixel electrode 9 are formed constitutes one dot area, and the respective dot areas arranged in a matrix shape can perform display.

The data lines 6a are electrically connected through contact holes 5 to source regions described below in a semiconductor layer 1a formed out of, for example, a polysilicon film and constituting the TFTs 30, and the pixel electrodes 9 are electrically connected through contact holes 8 to drain regions described below in the semiconductor layer 1a. In addition, the scanning lines 3a are arranged to face channel regions (areas hatched in the top-left direction in the figure) in the semiconductor layer 1a, and the portions of the scanning lines 3a facing the channel regions serve as gate electrodes.

Each capacitor line 3b has a main line portion (that is, as viewed two-dimensionally, a first area formed along the scanning lines 3a) extending along the scanning lines 3a in an almost straight line shape, and a projected portion (that is, as viewed two-dimensionally, a second area extending along the data lines 6a) projected from portions intersected with the data lines 6a toward the previous stage (upward in the figure) along the data lines 6a. In FIG. 2, the areas hatched in the top-right direction are provided with a plurality of first light shielding films 11a.

More specifically, the first light shielding films 11a are provided at positions where the TFTs 30 including the channel regions of the semiconductor layer 1a are covered as seen from the TFT array substrate side, and each has a main line portion facing the main line portion of the capacitor line 3b and extending in a straight line shape along the scanning line 3a, and a projected portion projected from portions intersected with the data lines 6a toward a next stage (downward in the figure) along the data lines 6a. The front ends of the downward projected portions of the first light shielding film 11a at each stage (pixel row) overlaps the front ends of the upward projected portions of the capacitor line 3b at the next stage under the data lines 6a. These overlapped places are provided with contact holes 13 for electrically connecting the first light shielding film 11a and the capacitor line 3b each other. That is, in this exemplary embodiment, the first light shielding films 11a are electrically connected to the capacitor lines 3b of the previous stage or the next stage through the contact holes 13.

As shown in FIG. 2, a reflective film 20 is formed at the center of one dot area. The areas in which the reflective film 20 is formed become reflective display areas R, and the areas in which the reflective film 20 is not formed, that is, the opening portion 21 of the reflective film 20, become transmissive display areas T.

Referring to FIGS. 3A and 3B, the structure of the liquid crystal display device according to this exemplary embodiment is described below. FIG. 3A is a schematic plan view illustrating the construction of one pixel in the liquid crystal display device according to this exemplary embodiment, and FIG. 3B is a schematic cross-sectional view corresponding to a red dot in the plan view of the FIG. 3A.

The liquid crystal display device according to this exemplary embodiment has, as shown in FIG. 2, dot areas formed by providing the pixel electrode 9 in each inside of the areas surrounded with the data lines 6a, the scanning lines 3a and the capacitor lines 3b. In the dot areas, as shown in FIG. 3A, one coloring layer out of three primary colors is provided correspondingly to one dot area, and a pixel including the respective coloring layers 22B (Blue), 22G (Green), and 22R (Red) is formed in three dot areas D1, D2, and D3.

On the other hand, as shown in FIG. 3B, in the liquid crystal display device according to this exemplary embodiment, the liquid crystal layer 50 made of a liquid crystal material whose initial alignment state is vertical, that is, a liquid crystal material having a negative dielectric anisotropy, is interposed between the TFT array substrate 10 and the counter substrate 25 opposite thereto. The TFT array substrate 10 has a construction in which a reflective film 20 formed out of a metal film having a high reflectivity, such as aluminum, silver, etc., is partially formed on a surface of a substrate body 10A formed out of light-transmissive material, such as quartz, glass, etc., with an insulating film 26 therebetween. As described above, the areas in which the reflective film 20 is formed become the reflective display areas R, and the areas in which the reflective film 20 is not formed, that is, opening portions 21 of the reflective film 20 become the transmissive display areas T. As described above, the liquid crystal display device according to this exemplary embodiment is a vertical alignment type liquid crystal display device including a vertical alignment type liquid crystal layer, and is also a transflective liquid crystal display device capable of performing reflective display and transmissive display. In addition, a surface of the insulating film 26 in the reflective display areas R has an uneven shape, and the surface of the reflective film 20 has uneven portions reflecting the uneven shape of the insulating film. Since the reflected light is scattered by the unevenness, external reflection is reduced or prevented, so that it is possible to obtain a display having a wide viewing angle.

An insulating film 26 formed on the substrate body 10A, is thicker in the reflective display areas R than in the transmissive display areas T. Therefore, a thickness of the liquid crystal layer 50 is less in the reflective display areas R than in the transmissive display areas T. The insulating film 26 is formed out of an organic film, such as acryl resin, etc., having a thickness of about 2 to 3 μm, and has sloping surfaces 26a such that the film thickness of the insulating film is continuously varied in the vicinity of the boundaries between the reflective display areas R and the transmissive display areas T. The thickness of the liquid crystal layer 50 in the transmissive display areas T, in which the insulating film 26 is formed to be thin, is about 4 to 6 μm, and the thickness of the liquid crystal layer 50 in the reflective display areas R is about a half of the thickness of the liquid crystal layer 50 in the transmissive display areas T.

Like above, the insulating film 26 serves as a liquid crystal layer-thickness adjusting layer to vary the thickness of the liquid crystal layer 50 in the reflective display areas R and the transmissive display areas T by using its own thickness. In this exemplary embodiment, edges of the upper flat surface of the insulating film 26 and edges of the reflective film 20 (reflective display areas) are substantially matched, and the sloping areas of the insulating film 26 are included in the transmissive display areas T. Due to existence of the insulating film 26 of the liquid crystal layer-thickness adjusting layer, the thickness of the liquid crystal layer 50 in the reflective display areas R can be made to be smaller than the thickness of the liquid crystal layer 50 in the transmissive display areas T, so that the retardation in the reflective display areas R and the retardation in the transmissive display areas T can be made to approach each other or to be substantially equal to each other. As a result, it is possible to obtain a high contrast display.

The pixel electrodes 9 made of a transparent conductive film, such as Indium Tin Oxide (hereinafter "ITO") and an alignment film (not shown) made of polyimide are formed on a surface of the TFT array substrate 10 including the surface of the insulating film 26. In this exemplary embodiment, the reflective film 20 and the pixel electrodes 9 are separately prepared and stacked, but a reflective film made of a metal film may be used as the pixel electrodes in the reflective display areas R. Further, an uneven shape is given to positions, corresponding to the reflective display areas R, of the insulating film 26 as the liquid crystal layer-thickness adjusting layer to give a scattering function to the reflective film 20. However, an insulating film to give the unevenness other than the insulating film 26 may be formed on the substrate body 10A, and the reflective film 20 may be formed on the insulating film. In this case, the insulating film 26 functioning as the liquid crystal layer-thickness adjusting layer is formed on the reflective film 20.

On the other hand, in the counter substrate 25 side, a color filter 22 (a red coloring layer 22R in FIG. 3(b)) is formed on a surface of a substrate body 25A (a liquid crystal layer-side surface of the substrate body 25A) made of a light-transmissive material, such as glass or quartz. The circumferential edge of a coloring layer 22R is surrounded with a black matrix BM, and the black matrices BM form the boundaries of the dot areas D1, D2, and D3. Then, an overcoat layer 33 made of resin is formed in the liquid crystal layer-side of the color filter 22, and a common electrode 31 made of a transparent conductive film, such as ITO, and an alignment film (not shown) made of polyimide, etc., are formed in the liquid crystal layer-side of the overcoat layer 33.

Further, projections 37 made of resin are formed on an alignment film forming surface (that is, a surface in contact with the liquid crystal layer) of the counter substrate 25, which are the transmissive display areas T. The projections 37 are provided, as shown in FIG. 3A, approximately at the centers of the transmissive display areas in the dot areas, and have sloping surfaces 37a forming a predetermined angle with respect to the substrate plane (the vertical alignment direction of the liquid crystal molecules), and the alignment of the liquid crystal molecules, specifically, the directions in which the vertically aligned liquid crystal molecules are slanted, are regulated in accordance with the direction of the sloping surfaces 37a. In order to regulate the directions in which the liquid crystal molecules are slanted in the transmissive display areas T, slits may be formed, for example, in the common electrode 31, instead of the projections 37.

In the liquid crystal display device according to this exemplary embodiment, a reflective film 20a is formed to two-dimensionally overlap with the projections 37. Specifically, on the substrate body 10A of the TFT array substrate 10, the reflective film 20a is selectively formed to overlap with the projections 37 to perform the alignment regulation of the liquid crystal molecules in the transmissive display areas T and to cover at least the projections 37 from the TFT array substrate 10. Therefore, in the areas where the reflective film 20a is formed (that is, the areas where the projections 37 are formed), the transmissive display from a backlight 15 is not allowed, so that the reflective display based on natural light incident from the counter substrate 25 side is executed.

The projections 37, which are the alignment regulating device, may be formed out of dielectric substance, such as resin, etc., and the projections 37 may have a step difference size of, for example, 0.05 to 0.5 μm. When the step difference size is less than 0.05 μm, the directions in which the liquid crystal molecules are slanted may not be regulated, and when the step difference size is more than 0.5 μm, the retardation difference of the liquid crystal layer between convex portions and concave portions of the steps may because too large, thereby causing the display defects. It is preferable that the step difference sizes of the projections 37 be within a range of about 0.07 to 0.2 μm, and in this case, it is possible to provide even better display.

Furthermore, the projections 37 have predetermined sloping surfaces, but the maximum sloping angle thereof may be 2° to 30°. In this case, the sloping angle indicates an angle which the substrate 10A and the sloping surfaces of the projections 37 form, and when the projections 37 have a curved surface, an angle which a surface tangent to the curved surface and the substrate form. When the maximum sloping angle of the sloping surfaces is less than 2°, it can be difficult to regulate the directions in which the liquid crystal molecules are slanted, and when the maximum sloping angle of the sloping surfaces is more than 30°, the vertical alignment of the liquid crystal molecules in those portions may be difficult, and the light leakage may occur in those portions, thereby causing defects, such as a decrease in contrast.

Furthermore, the projections 37 may be formed such that longitudinal sections thereof have a bilaterally symmetric shape. In this case, the liquid crystal molecules are slanted in the bilaterally symmetric directions about the projections 37, so that its visual characteristic is bilaterally symmetric. Furthermore, when a top and a bottom of the liquid crystal display device are determined, by forming the projections 37 in a shape which has an almost bilateral symmetry about the vertical axis as seen two-dimensionally, it is possible to make the visual characteristic further bilaterally symmetric. Furthermore, specifically in the insides of the dot areas, it is more preferable that the projections be formed in a bilateral symmetric shape about the vertical axis as viewed two-dimensionally.

The electrodes 9 and 31 of both of the TFT array substrate 10 and the counter substrate 25 are all subjected to a vertical alignment process. Further, a phase-difference plate 18 and a polarizer 19 are formed on an outer surface side of the TFT array substrate 10, and a phase-difference plate 16 and a polarizer 17 are formed on an outer surface side of the counter substrate 25 to allow circular polarized light to be incident on the inner surface side of the substrates. As the structure of the polarizer 17 (19) and the phase-difference plate 16 (18), a circular polarizing plate obtained by combining a polarizer and a λ/4 phase-difference plate, or a wide-band circular polarizing plate obtained by combining a polarizer, a λ/2 phase-difference plate, and a λ/4 phase-difference plate, or a viewing angle compensating plate combining a polarizer, a λ/2 phase-difference plate, a λ/4 phase-difference plate, and a negative C plate (a phase-difference plate having an optical axis in a thickness direction) can be employed. Furthermore, a backlight 15, which is the light source for transmissive display, is provided in outside of the polarizer 19 formed on the TFT array substrate 10.

According to the liquid crystal display device of this exemplary embodiment, since the projections 37 are formed on the interface with the liquid crystal layer 50, the directions in which the vertically aligned liquid crystal molecules are slanted are regulated by the projections 37, and as a result, the disclination hardly occurs when a voltage is applied between the electrodes 9 and 31, so that the generation of display defects, such as afterimages, can be reduced or suppressed and any defects where unevenness of displaying is visualized when viewing the display plane from an oblique direction hardly occur. Since the projections 37 are formed out of a dielectric substance, such as resin, a voltage is not applied properly between the electrodes due to capacitance of the projections 37, so that the brightness may be decreased. However, in this exemplary embodiment, since the reflective film 20a is formed to two-dimensionally overlap with the projections 37, the areas where the projections 37 are formed can be used for the reflective display, and in this case, since the light incident from the display plane side passes through the liquid crystal layer two times, the voltage between the electrodes is relatively low, so that a relative bright display can be obtained only by slightly slanting the liquid crystal molecules.

That is, when the areas where the projections 37 are formed are used for the transmissive display, the light incident from a backlight 15 side passes through the liquid crystal layer 50 only one time. To the contrary, in this exemplary embodiment, since the areas where the projections 37 are formed are used for the reflective display, the light (natural light, such as sunlight or external light) incident from the counter substrate 25 side passes through the liquid crystal layer 50 two times for use in the display, and even if applying the same voltage as a case in which the areas where the projections 37 are formed are used for the transmissive display, it is possible to realize a relatively bright display.

Furthermore, when the areas where the projections are formed are used for the reflective display as described above, the contrast in the transmissive display is enhanced, but the contrast in the reflective display is not damaged as much. However, since the contrast of 1:200 or more is generally required for the transmissive display but the contrast of about 1:30 is sufficient for the reflective display, there is no problem. This is because even if the contrast of 1:30 or more can be obtained for the reflective display, the enhancement of contrast cannot be recognized sufficiently due to scattering of external light.

[Second Exemplary Embodiment]

A second exemplary embodiment of the present invention is described below with reference to the figures.

Figure 4A:
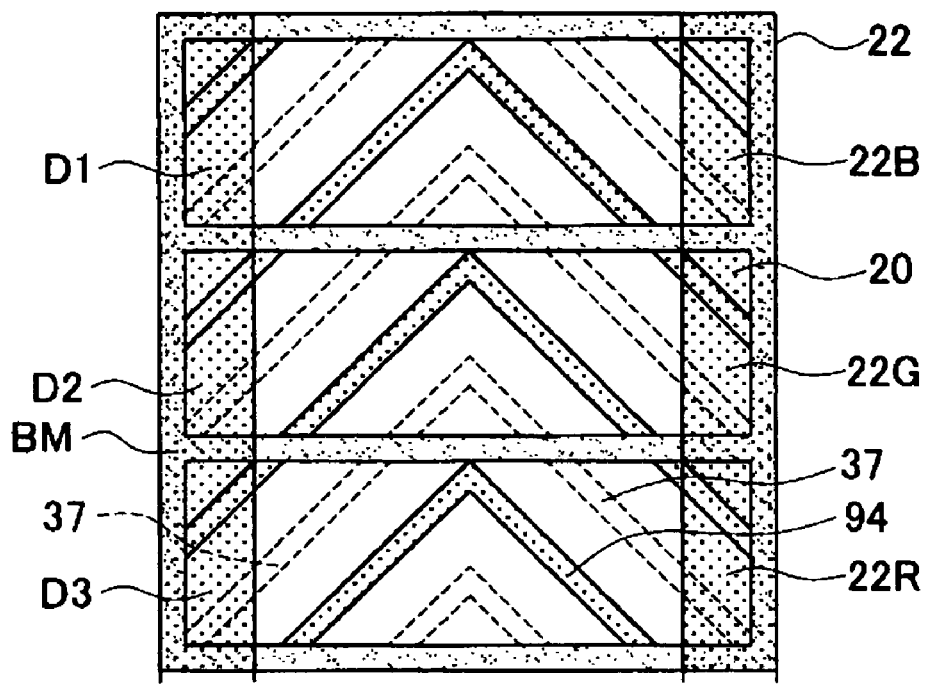
FIGS. 4A and 4B are a schematic plan view and a schematic cross-sectional view illustrating a significant part of a liquid crystal display device according to a second exemplary embodiment.
Figure 4B:
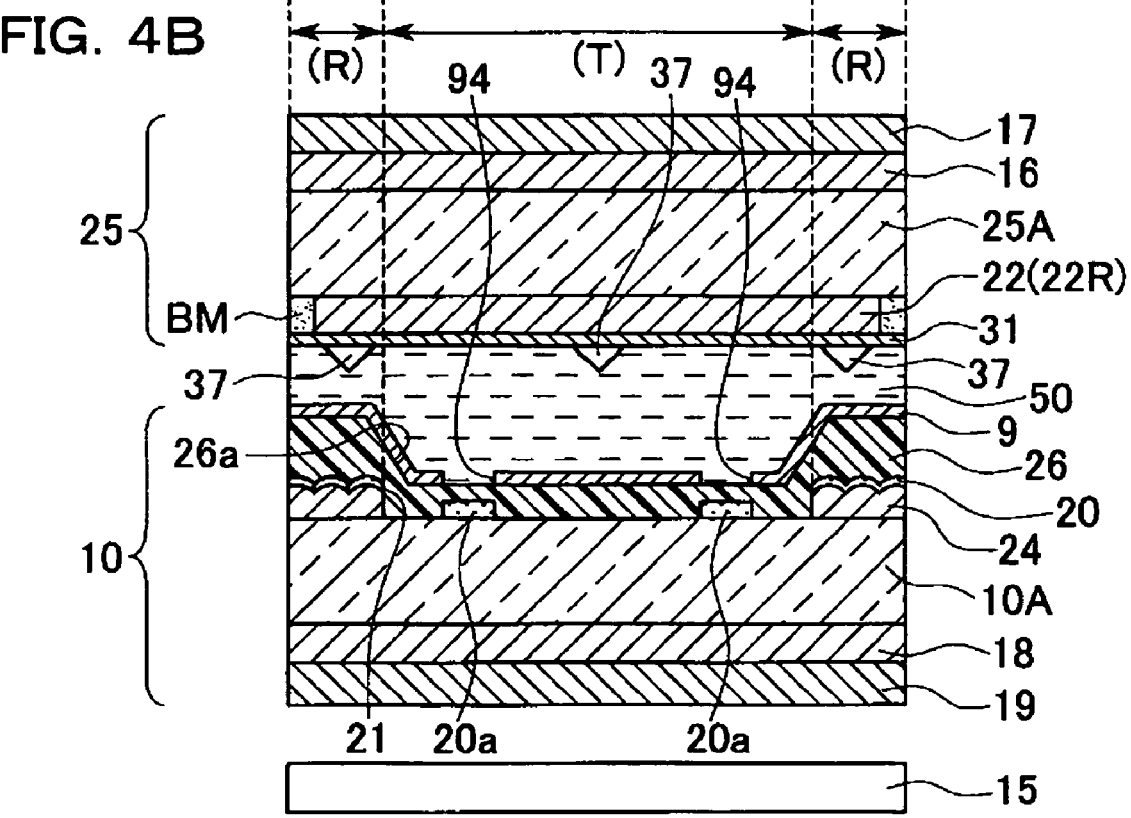

FIGS. 4A and 4B are a plan view and a cross-sectional view of a liquid crystal display device according to the second exemplary embodiment, which are schematics corresponding to FIGS. 3A and 3B of the first exemplary embodiment. The basic construction of the liquid crystal display device of this exemplary embodiment is similar to that of the first exemplary embodiment, but is largely different from that of the first exemplary embodiment in that a device to give unevenness to the reflective film 20 is added and slits 94 are formed as the alignment regulating device in the pixel electrodes 9 of the TFT array substrate 10 side in the transmissive display areas T. Therefore, in FIGS. 4A and 4B, elements common to those of FIGS. 3A and 3B are denoted by the same reference numerals, and detailed descriptions thereof are omitted.

In the liquid crystal display device according to this exemplary embodiment, the TFT array substrate 10 has a construction in which the reflective film 20 is partially formed on the surface of the substrate body 110A with the insulating film 24 therebetween. The areas where the reflective film 20 is formed become the reflective display areas R, and the areas where the reflective film 20 is not formed, that is, the opening portions 21 of the reflective film 20, become the transmissive display areas T. Furthermore, a surface of the insulating film 24 in the reflective display areas R has an uneven shape, and the surface of the reflective film 20 has an unevenness copying the uneven shape.

Further, the insulating film 26 is formed on the substrate body 10A over the transmissive display areas T and the reflective display areas R, and specifically in the reflective display areas R, the insulating film 26 is formed to cover the insulating film 24 and the reflective film 20. The insulating film 26 has a larger thickness in the reflective display areas R than in the transmissive display areas T, so that the thickness of the liquid crystal layer 50 is smaller in the reflective display areas R than in the transmissive display areas T. Furthermore, in the interfaces between the reflective display areas R and the transmissive display areas T, the insulating film 26 has sloping areas including the sloping surfaces 26a to continuously vary its own thickness. As a result, in this exemplary embodiment, the insulating film 26 serves as the liquid crystal layer-thickness adjusting layer to make the thickness of the liquid crystal layer 50 different between the reflective display areas R and the transmissive display areas T by using its own thickness.

Furthermore, in the liquid crystal display device according to this exemplary embodiment, slits (opening portions) 94 are formed in some parts of the pixel electrodes 9. In this case, in the areas where the slits 94 are formed, a tilted electric field is generated between the electrodes 9 and 31, so that it is possible to regulate the directions in which the liquid crystal molecules are slanted along the tilted electric field.

In the liquid crystal display device according to this exemplary embodiment, the reflective film 20a is formed to two-dimensionally overlap with the slits 94. Specifically, on the substrate body 10A of the TFT array substrate 10, the reflective film 20a is selectively formed to overlap with the slits 94 for performing the alignment regulation of the liquid crystal molecules in the transmissive display areas T and to cover the slits 94 formed at least in the transmissive display areas T from the TFT array substrate 10 side. Therefore, in the areas where the reflective film 20a is formed (that is, the areas where the slits 94 are formed), the transmissive display from the backlight 15 is not allowed, so that the reflective display based on natural light incident from the counter substrate 25 side is executed.

Further, in an alignment film forming surface (that is, a surface in contact with the liquid crystal layer) of the counter substrate 25, projections 37 made of resin are formed. The projections 37, as shown in FIG. 4A, are arranged over the dot areas in a longitudinal shape, and have sloping surfaces to form a predetermined angle with respect to the substrate plane (a direction in which the liquid crystal molecules are vertically aligned). Furthermore, in this exemplary embodiment, the projections 37 positioned in the reflective display areas R overlap with the reflective film 20, but the projections positioned in the transmissive display areas T do not overlap with the reflective film. However, for example, as shown in FIGS. 5A and 5B, the reflective film 20a may be formed to overlap with the projections 37 positioned in the transmissive display areas T.

According to the liquid crystal display device of this exemplary embodiment, since the projections 37 and the slits 94 are formed in the interfaces with the liquid crystal layer 50, the directions in which the vertically aligned liquid crystal molecules are slanted are regulated by the projections 37 and the slits 94. Therefore, when a voltage is applied between the electrodes 9 and 31, hardly any disclination occurs, so that the generation of display defects, such as afterimages, is reduced or suppressed, and any defects where unevenness of displaying is visualized when viewing its display surface from an oblique direction hardly occur. In the areas where the slits 94 are formed, since a voltage is not applied properly between the electrodes, the brightness may be decreased. However, in this exemplary embodiment, since the reflective film 20a is formed to two-dimensionally overlap with the slits 94, the areas where the slits 94 are formed can be used for the reflective display, and in this case, since the light incident from the display plane side passes through the liquid crystal layer two times, the voltage between the electrodes is relatively low, so that a relative bright display can be obtained only by slightly slanting the liquid crystal molecules.

As the exemplary embodiment shown in FIGS. 4A and 4B, if the slits 94 provided in the pixel electrodes 9 of the TFT array substrate 10 side are arranged to two-dimensionally overlap with the reflective film 20a, the slits 94 and the reflective film 20a arranged to overlap with the slits are provided in the same substrate side, so that mutual alignment therebetween is facilitated, and it is possible to form the reflective film 20a having a size almost equal to the slits 94. Therefore, it is possible to ensure in maximum a size (an area viewed two-dimensionally) of the transmissive display areas T, so that the liquid crystal display device can be used suitably as a display unit of an electronic apparatus in which the transmissive display is valued.

Figure 5A:
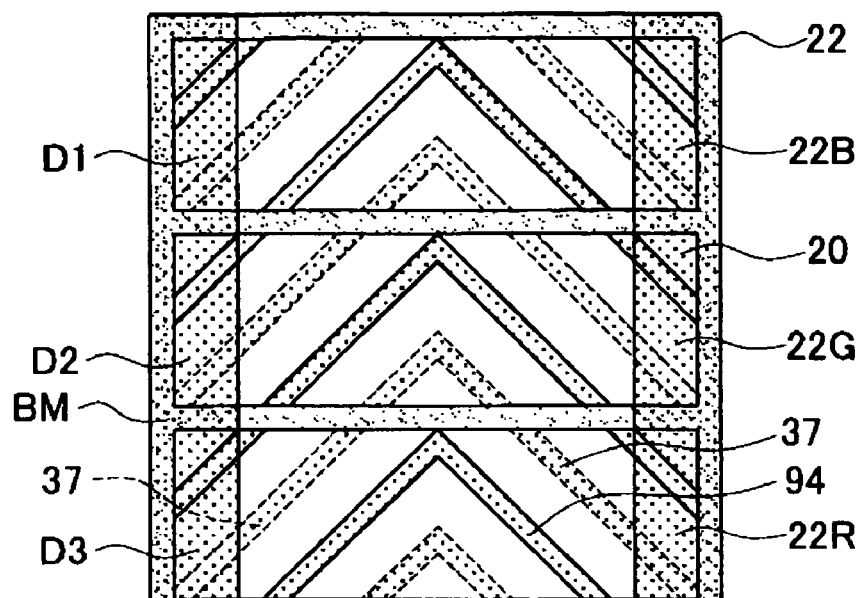
FIGS. 5A and 5B are a schematic plan view and a schematic cross-sectional view illustrating an exemplary modification of the liquid crystal display device according to the second exemplary embodiment.
Figure 5B:
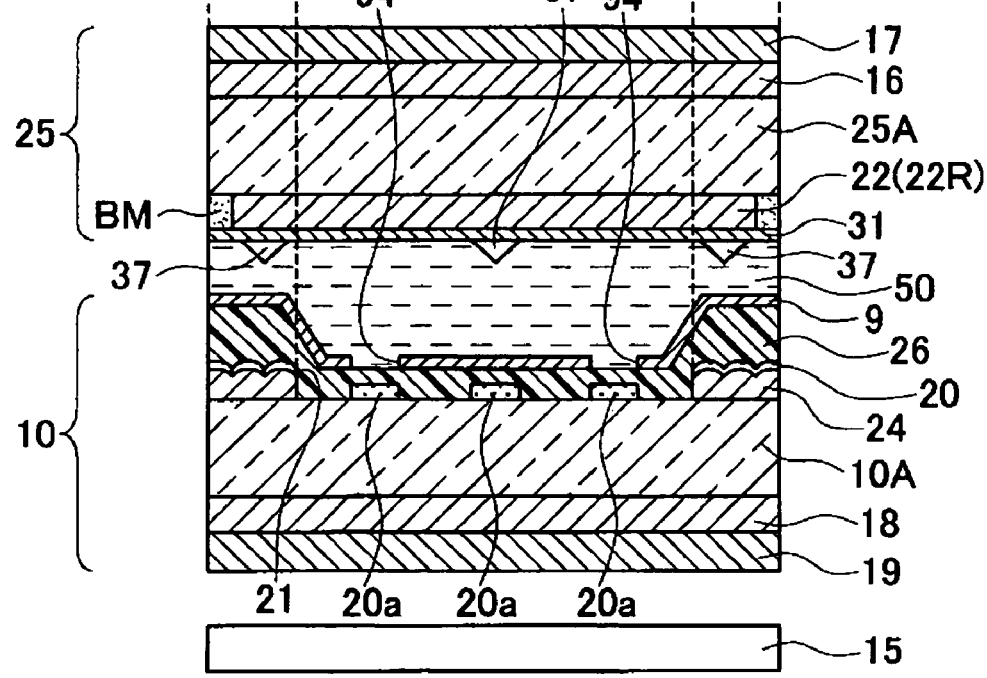

Furthermore, as shown in FIGS. 5A and 5B, when the reflective film 20a is formed to overlap with the projections 37 positioned in the transmissive display areas T on the counter substrate 25 side, the areas where the projections 37 are formed can be used for the reflective display, and in this case, since the light incident from the display plane side passes through the liquid crystal layer two times, the voltage between the electrodes is relatively low, so that a relative bright display can be obtained only by slightly slanting the liquid crystal molecules.

In the exemplary embodiment shown in FIGS. 4A–5B, the reflective film 20a under the slits 94 provides a specular reflection. Therefore, in order to disperse the reflected light to obtain a bright reflective display, it is preferable that a forward scattering plate be provided on the outer surface side (for example, between the substrate body 25A and the phase-difference plate 16) of the substrate body 25A of the counter substrate 25. As the forward scattering plate, a plate formed out of a film obtained by dispersing resin balls in polymers having different indexes of refraction may be employed, and in this case, since a backward scattering thereof is small, there is a feature that the contrast is not damaged.

Furthermore, in the exemplary embodiment shown in FIGS. 5A and 5B, since the reflective film 20a overlapping with the projections 37 formed in the counter substrate 25 side lies in the TFT array substrate 10 side, it is necessary that the reflective film 20a is prepared to have a size larger by a margin corresponding to the assembly accuracy of the substrates 25, 10. Therefore, there may be a problem in that areas of the transmissive display areas T are decreased. However, unlike the exemplary embodiment shown FIGS. 4A and 4B, since the areas where the projections are formed in the counter substrate 25 side contribute to the reflective display, the brightness of the total display of the reflective display and the transmissive display can be increased.

[Third Exemplary Embodiment]

A third exemplary embodiment of the present invention is described below with reference to the figures.

Figure 6A:
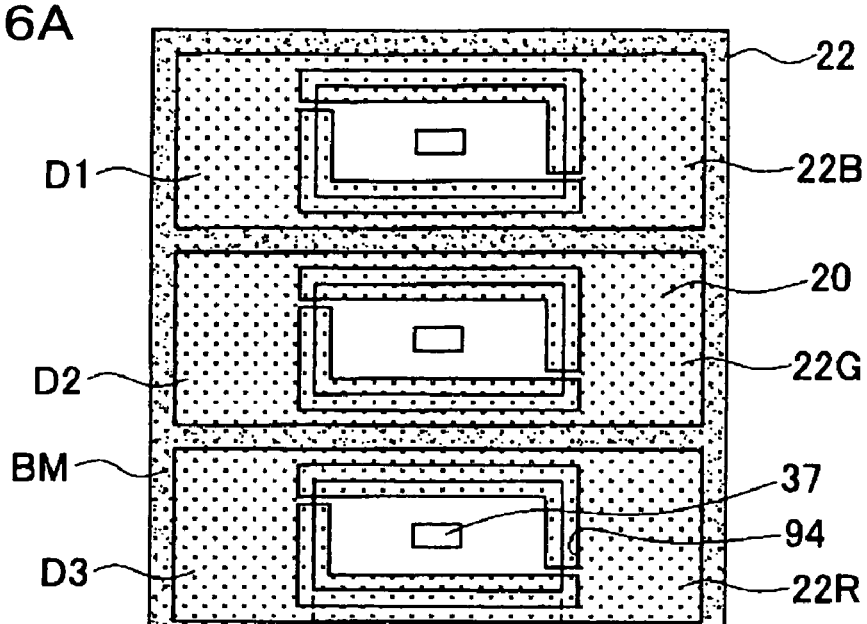
FIGS. 6A and 6B are a schematic plan view and a schematic cross-sectional view illustrating a significant part of a liquid crystal display device according to a third exemplary embodiment.
Figure 6B:
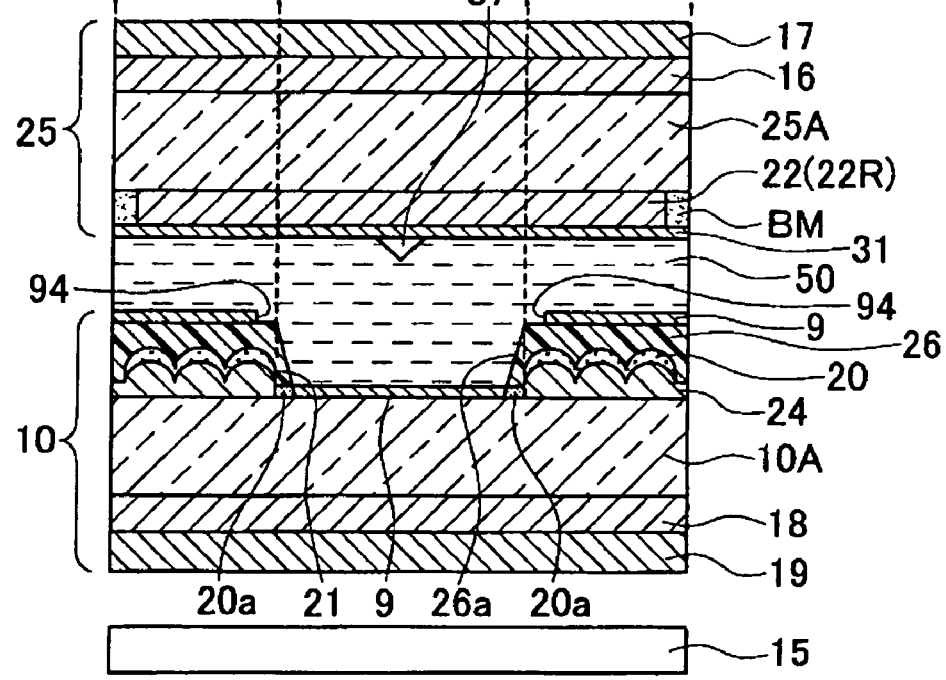

FIGS. 6A and 6B are a plan view and a cross-sectional view of a liquid crystal display device according to the third exemplary embodiment, which are schematics corresponding to FIGS. 3A and 3B of the first exemplary embodiment. A basic construction of the liquid crystal display device according to this exemplary embodiment is similar to that of the first exemplary embodiment, but is largely different from that of the first exemplary embodiment in constructions of the projections and the slits to regulate the alignment of the liquid crystal molecules. Therefore, in FIGS. 6A and 6B, elements common to those of FIGS. 3A and 3B are denoted by the same reference numerals, and detailed descriptions thereof are omitted.

In the liquid crystal display device according to this exemplary embodiment, the TFT array substrate 10 has a construction that the reflective film 20 is partially formed on the surface of the substrate body 10A with the insulating film 24 therebetween. The areas where the reflective film 20 is formed become the reflective display areas R, and the areas where the reflective film 20 is not formed, that is, the opening portions 21 of the reflective film 20, become the transmissive display areas T. The surface of the insulating film 24 in the reflective display areas R has an uneven shape, and the surface of the reflective film 20 has an unevenness copying the uneven shape.

In the reflective display areas R, the insulating film 26 is formed to cover the insulating film 24 and the reflective film 20, and with formation of the insulating film 26, the thickness of the liquid crystal layer 50 is smaller in the reflective display areas R than in the transmissive display areas T. Further, in the interfaces between the reflective display areas R and the transmissive display areas T, the insulating film 26 has sloping areas including the sloping surfaces 26a to continuously vary its own thickness, and the sloping surfaces 26a are positioned in the transmissive display areas T. Furthermore, in the transmissive display areas T, the pixel electrodes 9 are formed on the substrate body 10A without the insulating film therebetween.

The liquid crystal display device according to this exemplary embodiment includes the slits 94 formed by partially opening the pixel electrodes 9, on the sloping surfaces 26a in the transmissive display areas T. In this case, in the areas where the slits 94 are formed, a tilted electric field is generated between the electrodes 9 and 31, so that it is possible to regulate the directions in which the liquid crystal molecules are slanted along the tilted electric field.

In the liquid crystal display device according to this exemplary embodiment, the reflective film 20a is formed to two-dimensionally overlap with the slits 94 in the sloping surfaces 26a. Specifically, on the substrate body 10A of the TFT array substrate 10, the reflective film 20a is selectively formed to overlap with the slits (opening portions) 94 to perform the alignment regulation of the liquid crystal molecules in the transmissive display areas T and to cover at least the slits 94 from the TFT array substrate 10 side. The reflective film 20a may be formed to be connected to the reflective film 20. Therefore, in the areas where the reflective film 20*a* is formed (that is, the areas where the slits 94 are formed, in other words, the areas where the sloping surfaces 26*a* are formed), the transmissive display from the backlight 15 is not allowed, so that the reflective display is performed based on natural light incident from the counter substrate 25 side.

According to the liquid crystal display device of this exemplary embodiment, since some parts of the pixel electrodes 9 are opened to form the slits 94 at least in the sloping surfaces 26*a* of the insulating film 26, which is the liquid crystal layer-thickness adjusting layer, the directions in which the vertically aligned liquid crystal molecules are slanted are regulated by the slits 94. Therefore, when a voltage is applied between the electrodes 9 and 31, hardly any disclination occurs, so that the generation of display defects, such as afterimages, can be reduced or suppressed, and any defects where unevenness of displaying is visualized when viewing the display plane from the oblique direction hardly occur.

In the areas where the slits 94 are formed, since a voltage is not applied well between the electrodes, the brightness may be decreased. However, in this exemplary embodiment, since the reflective film 20*a* is formed to two-dimensionally overlap with the slits 94, the areas where the slits 94 are formed are used for the reflective display, and in this case, since the light incident from the display plane side passes through the liquid crystal layer two times, the voltage between the electrodes is relatively low, so that a relative bright display can be obtained only by slightly slanting the liquid crystal molecules.

Furthermore, in this exemplary embodiment, since the slits 94 are provided in the sloping surface 26*a*, the liquid crystal layer 50 in the areas where the slits 94 are formed is thicker than that in the reflective display areas R other than the areas. Therefore, in the areas where the slits 94 are formed, it is difficult to operate the liquid crystal molecules, but it is possible to obtain a bright display since the liquid crystal layer has a relatively larger thickness.

[Fourth Exemplary Embodiment]

A fourth exemplary embodiment of the present invention is described below with reference to the figures.

Figure 7A:
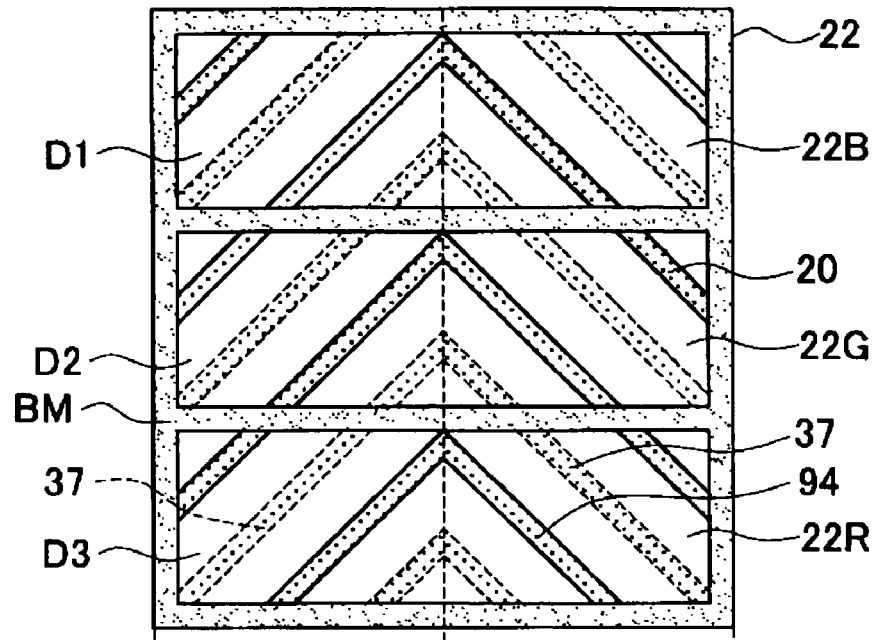
FIGS. 7A and 7B are a schematic plan view and a schematic cross-sectional view illustrating a significant part of a liquid crystal display device according to a fourth exemplary embodiment.
Figure 7B:
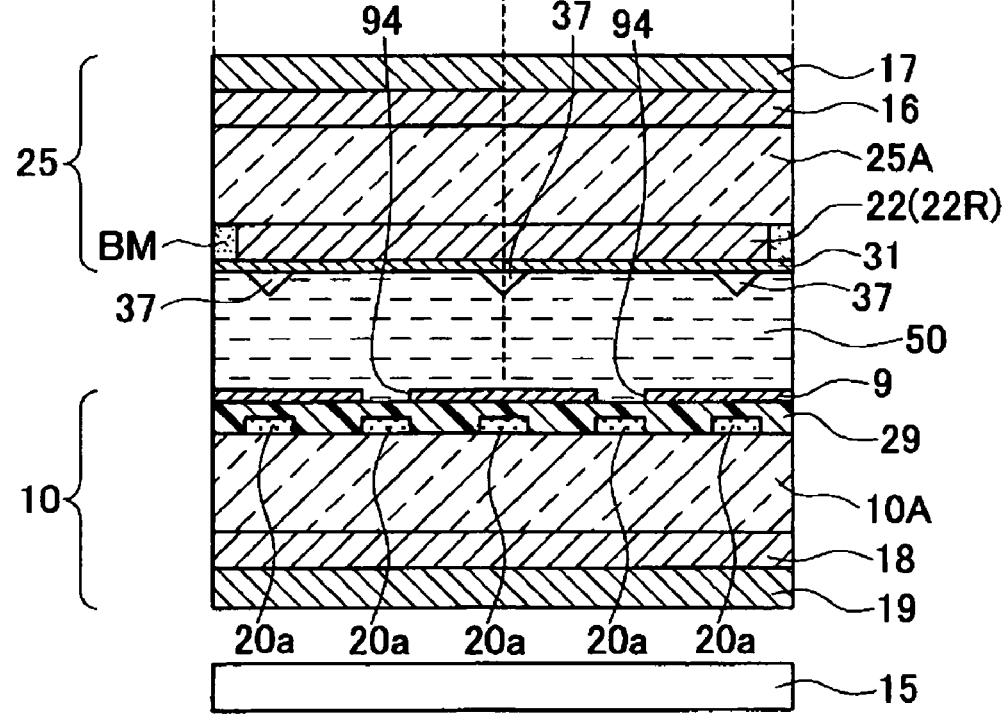

FIGS. 7A and 7B are a plan view and a cross-sectional view of a liquid crystal display device according to the third exemplary embodiment, which are schematics corresponding to FIGS. 3A and 3B of the first exemplary embodiment. The basic construction of the liquid crystal display device according to this exemplary embodiment is similar to that of the first exemplary embodiment, but is largely different from that of the first exemplary embodiment, in the constructions of the projections and the slits to regulate the alignment of the liquid crystal molecules and in that the reflective film 20 is not provided. Therefore, in FIGS. 7A and 7B, elements common to those of FIGS. 3A and 3B are denoted by the same reference numerals, and detailed descriptions thereof are omitted.

In the liquid crystal display device according to this exemplary embodiment, the TFT array substrate 10 includes an insulating film 29 on the substrate body 10A, and the pixel electrodes 9 having the slits 94 are partially formed on the insulating film 29. In this case, in the areas where the slits 94 are formed, a tilted electric field is generated between the electrodes 9 and 31, so that it is possible to regulate the directions in which the liquid crystal molecules are slanted along the tilted electric field.

On the other hand, the projections 37 are formed on the common electrode 31 (specifically, on an alignment film formed on the common electrode 31) of the counter substrate 25. A sloping surface is formed on a surface of the projection 37, and it is possible to regulate the directions in which the liquid crystal molecules are slanted along the sloping surface.

In the liquid crystal display device according to this exemplary embodiment, a reflective film 20*a* is formed to two-dimensionally overlap with the projections 37 and the slits 94. Specifically, the reflective film 20*a* is selectively formed on the substrate body 10A of the TFT array substrate 10 to overlap with the projections 37 and the slits (opening portions) 94 to perform the alignment regulation of the liquid crystal molecules and to cover at least the projections 37 and the slits 94 from the TFT array substrate 10 side. Therefore, in the areas where the reflective film 20*a* is formed (that is, areas where the projections 37 and the slits 94 are formed), the transmissive display from the backlight 15 is not allowed, and only the reflective display based on the natural light incident from the counter substrate 25 side are executed.

The liquid crystal display device of this exemplary embodiment performs mainly the transmissive display by using the source light from the backlight 15, and specifically since some parts of the pixel electrodes 9 are opened to form the slits 94 and the projections 37 are formed on an interface with the liquid crystal layer 50, the directions in which the vertically aligned liquid crystal molecules are slanted are regulated by the slits 94 and the projections 37. Therefore, when a voltage is applied between the electrodes 9 and 31, hardly any disclination occurs, so that the generation of display defects, such as afterimages, can be reduced or suppressed, and any defects where unevenness of displaying is visualized when viewing the display plane from the oblique direction hardly occur.

Since it is difficult to apply a voltage between the electrodes in the areas where the slits 94 and the projections 37 are formed, the brightness may be decreased, but in this exemplary embodiment, since the reflective film 20*a* is formed such that the slits 94 and the projections 37 two-dimensionally overlap each other, the areas where the slits 94 and the projections 37 are formed can be used for the reflective display. Therefore, by forming the slits 94 and the projections 37, it is possible to secure the maximum transmissive display areas without a decrease in brightness of the transmissive display. In addition, since the areas where the slits 94 and the projections 37 are formed can be used at least as the reflective display areas, the light incident from the display plane side passes through the liquid crystal layer two times, and since the voltage between the electrodes is relatively low, a relatively bright display can be obtained only by slightly slanting the liquid crystal molecules, so that it is possible to realize a suitable transflective liquid crystal display device.

Furthermore, in the exemplary embodiment shown in FIGS. 7A and 7B, the reflective film 20*a* under the slits 94 and the projections 37 provides a specular reflection. Therefore, in order to disperse the reflected light to obtain a bright reflective display, it is preferable that a forward scattering plate be provided on the outer surface (for example, between the substrate body 25A and the phase-difference plate 16) of the substrate body 25A of the counter substrate 25. As the forward scattering plate, a plate formed out of a film obtained by dispersing resin balls in polymers having different indexes of refraction may be employed, and in this case, since a backward scattering thereof is small, there is a feature that the contrast is not damaged.

[Exemplary Electronic Apparatus]

A specific example of an electronic apparatus including the liquid crystal display device according the above exemplary embodiments of the present invention is described below.

Figure 8:
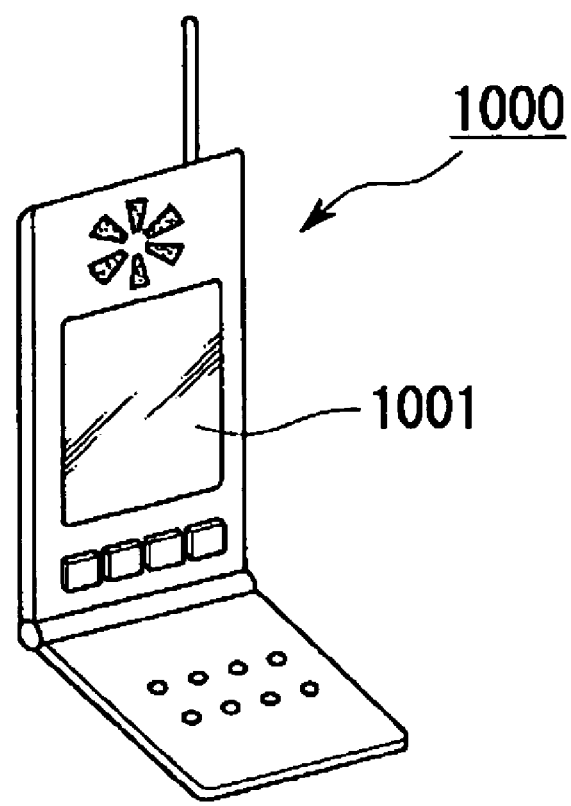
FIG. 8 is a perspective view illustrating an example of an electronic apparatus according to the present invention.

FIG. 8 is a perspective view illustrating an example of a portable phone. In FIG. 8, reference numeral 1000 denotes a main body of the portable phone, and reference numeral 1001 denotes a display unit employing the above liquid crystal display device. When the liquid crystal display devices according to the above exemplary embodiments are used in the display unit of the electronic apparatus, such as the portable phone, etc., it is possible to realize an electronic apparatus including a liquid crystal display unit having a high contrast and a wide viewing angle, and being bright regardless of environments for use thereof.

A technical scope of the present invention is not limited to the aforementioned exemplary embodiments, and modifications and changes may be made thereto without departing from intention of the present invention. For example, although the present invention has been applied to an active matrix liquid crystal display device employing TFTs as switching elements in the aforementioned exemplary embodiments, the present invention may be applied to an active matrix liquid crystal display device employing thin film diodes (TFDs) as the switching elements, a passive matrix liquid crystal display device, etc., for example. On the other hand, the specific descriptions of materials, measures, shapes, etc., of various elements may be properly modified and changed.

What is claimed is:

1. A liquid crystal display device, comprising:
    a pair of substrates;
    a liquid crystal layer interposed between the pair of substrates, the liquid crystal layer being formed of liquid crystal with a negative dielectric anisotropy;
    transmissive display areas for transmissive display and reflective display areas for reflective display provided in one dot area;
    electrodes to drive the liquid crystal formed on liquid crystal sides of the pair of substrates, electrodes of at least one substrate of the pair of substrates being provided with at least one of opening portions formed by making opening portions in parts of the electrodes or convex-shaped portions made of a dielectric substance formed on the electrodes, the at least one of the opening portions or the convex-shaped portions serving as alignment regulators to regulate alignment of the liquid crystal; and
    a reflective film disposed between the pair of substrates at positions that two-dimensionally overlap the transmissive display areas and the at least one of the opening portions or the convex-shaped portions in plan view.

2. The liquid crystal display device according to claim 1, the pair of substrates including an upper substrate and a lower substrate, a side of the lower substrate opposite to the liquid crystal layer side of the lower substrate being provided with a backlight for transmissive display, and the liquid crystal side of the lower substrate being provided with a first reflective film for reflective display selectively formed in the reflective display areas, the first reflective film being interposed between the lower substrate and the liquid crystal layer, and
    a second reflective film to prevent transmission, arranged to two-dimensionally overlap with the at least one of the opening portions for transmissive-area liquid crystal control and the convex-shaped portions for transmissive-area liquid crystal control formed in the transmissive display areas, being formed in the transmissive display areas.

3. The liquid crystal display device according to claim 2, of the at least one of the opening portions for transmissive-area liquid crystal control or the convex-shaped portions for transmissive-area liquid crystal control, at least the at least one of the opening portions or the convex-shaped portions provided in the electrodes of the lower substrate side being arranged to two-dimensionally overlap with the second reflective film.

4. The liquid crystal display device according to claim 1, all of the at least one of the opening portions and the convex-shaped portions provided in the electrodes being arranged to two-dimensionally overlap with the reflective film.

5. The liquid crystal display device according to claim 1, the liquid crystal layer having a larger thickness in the transmissive display areas than in the reflective display areas, and the liquid crystal display layer having a larger thickness in the areas where the reflective film is arranged to two-dimensionally overlap with the at least one of the opening portions for transmissive-area liquid crystal control or the convex-shaped portions for transmissive-area liquid crystal control is formed than in the reflective display areas.

6. The liquid crystal display device according to claim 5, in order to make the liquid crystal layer in the transmissive display areas thicker than the liquid crystal layer in the reflective display areas, a liquid crystal layer-thickness adjusting layer being provided between at least one substrate of the pair of substrates and the liquid crystal layer.

7. The liquid crystal display device according to claim 1, the at least one of the opening portions and the convex-shaped portions having a construction to regulate a slanting direction of vertically aligned liquid crystal molecules in accordance with variation of an electric field.

8. An electronic apparatus, comprising:
    the liquid crystal display device according to claim 1.

* * * * *